April 2, 1929.   H. G. PONTING ET AL   1,707,767
FILM HOLDER
Filed Nov. 10, 1922   3 Sheets-Sheet 1

INVENTORS
Herbert George Ponting,
George William Ford,
by Byrnes, Stebbins & Parmelee,
their attys.

April 2, 1929.  H. G. PONTING ET AL  1,707,767
FILM HOLDER
Filed Nov. 10, 1922  3 Sheets-Sheet 2

INVENTORS
Herbert George Ponting
George William Ford

April 2, 1929.  H. G. PONTING ET AL  1,707,767
FILM HOLDER
Filed Nov. 10, 1922  3 Sheets-Sheet 3

INVENTORS

Patented Apr. 2, 1929.

1,707,767

UNITED STATES PATENT OFFICE.

HERBERT GEORGE PONTING, OF LONDON, AND GEORGE WILLIAM FORD, OF KENSINGTON, LONDON, ENGLAND; SAID FORD ASSIGNOR TO SAID PONTING.

FILM HOLDER.

Application filed November 10, 1922, Serial No. 600,126, and in Great Britain May 12, 1921.

The present invention relates broadly to film holders, and more particularly to holders for films of the type adapted to have a series of images, negative or positive, produced thereon either independently or in continuous succession, or of the type having a series of formed images thereon adapted to be projected either intermittently, as for stereopticon purposes, or in continuous succession as in kinematography.

Considerable difficulty has heretofore been experienced in the handling, use and storage of films of all characters due to many well known causes, such as dust, light, heat, fire etc. Also a great deal of time, skill and patience has been required to thread a strip of film of the type ordinarily used in kinematographic work into a projecting apparatus of photographing apparatus or camera. The same has been true, although to a moderately less extent, in the threading of roll films into an ordinary camera.

By the present invention these objections are entirely obviated and there is provided a holder for strip films of any description of such construction that the film may be either substantially entirely enclosed for storage purposes, or may have a length thereof exposed, as may be required in the particular apparatus in which the film is being used.

In the accompanying drawings there is shown for purposes of illustration only, certain embodiments of the present invention, it being understood that the drawings do not define the limits of the invention and that changes may be made in the construction and operation disclosed therein without departing from the spirit of the invention or the scope of our broader claims. In the drawings:—

Figure 3:
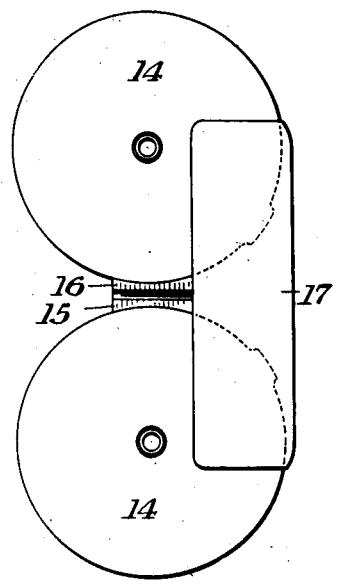
Figures 3 and 4 are front and side views, respectively, of a modified form of holder.
Figure 4:
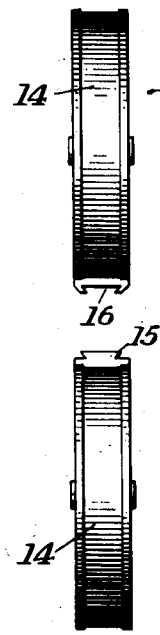
Figure 5:
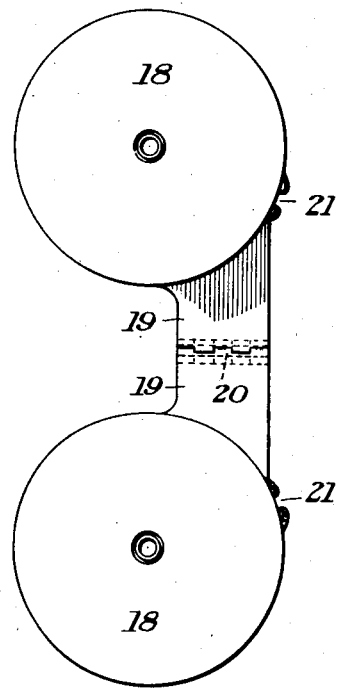
Figure 6:
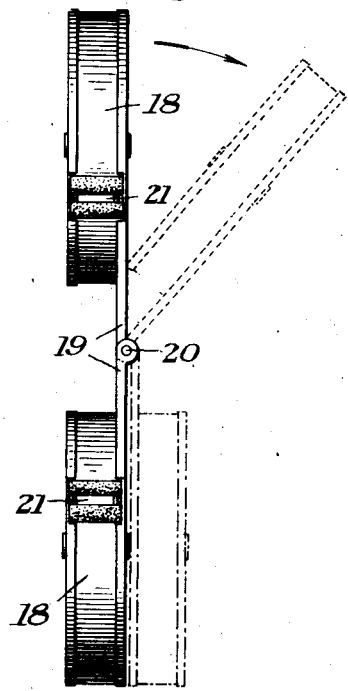
Figure 7:
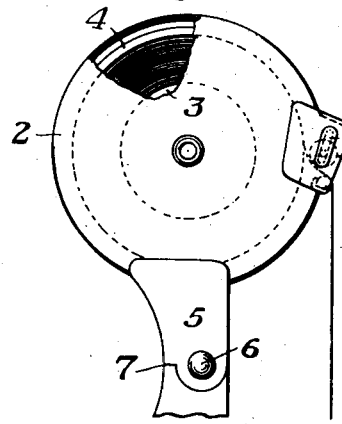
Figure 8:
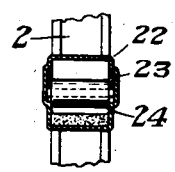

Figures 5 and 6 are views corresponding to Figures 3 and 4, illustrating another embodiment of the invention; and Figures 7 and 8 are detail views illustrating a further modification.

Figure 1:
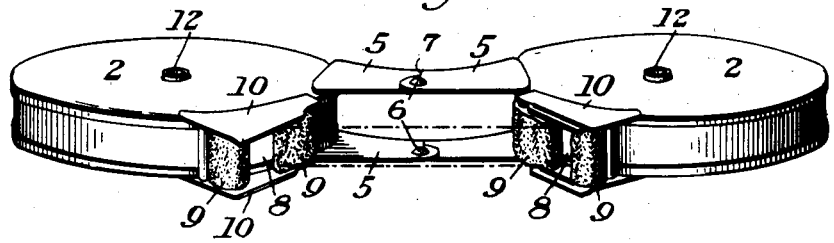
Figure 1 is a perspective view showing one form of holder opened or ready for use.
Figure 2:
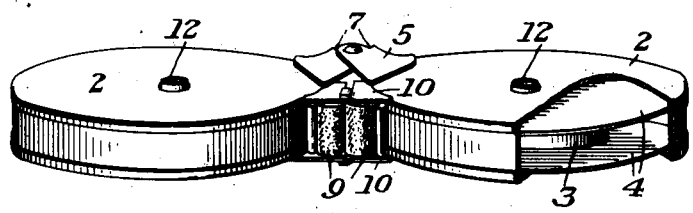
Figure 2 is a similar view showing the same holder in closed position.
Figures 9, 10, 11, 12, 13:
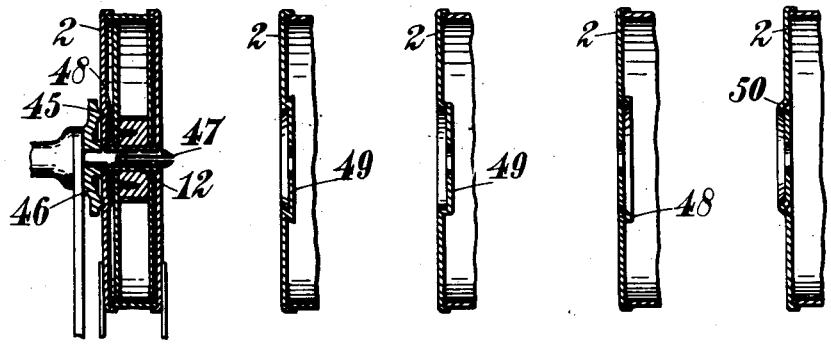

Figure 9 is a detail sectional view showing part of a holder according to Figures 1 and 2, and illustrating how it is registered in the machine.

Figures 10, 11, 12 and 13 are detail views of modifications.

Referring first to that form of the invention illustrated in Figures 1 and 2, a film holder embodying the present invention may comprise a plurality of containers 2, each of which may have permanently or removably mounted therein a spool or roller 3 having side flanges 4 of suitable construction to guide the film with respect thereto. Each of the containers may be provided with lugs or plates 5 projecting therefrom. These plates may be hingedly connected in any desired manner as by rivets 6, permitting the containers 2 to be swung toward and from each other about the axis of the rivets 6. This axis extends substantially parallel with the axes of the rollers or spools 3 and is preferably substantially equidistant from the edges of the respective containers.

It will be apparent that the diameter and thickness of the respective containers 2 may be varied in accordance with the dimensions of the particular film which the holder is adapted to receive. Irrespective of these dimensions, however, the positioning of the plates 5 and the rivets 6 is such that when the containers are swung into the position shown in Figure 1 they will be in the correct relative positions required by the particular instrument or apparatus with which the holder is to be used. This opening movement may conveniently be limited by providing cooperating stops 7 on the plates 5.

Each of the containers 2 is preferably closed on its periphery except for a small opening 8, through which the film enters or leaves. In Figure 1 the film is indicated in chain lines as extending between the respective openings in the containers 2. These openings are so positioned relatively to the axis of the pivotal connections 6, that when the containers are swung to closed position the openings come opposite one another, as shown in Figure 2, whereby the length of film exposed between the containers is reduced. Each of the openings may be provided with walls 9 of suitable construction adapted when swung together to come into contact with each other and provide a complete enclosure for the opposite sides of the film. The edges of the films may be in turn protected during such time as the containers are in closed position by providing plates 10 on the respective containers so shaped that when in cooperating position they will overlap as illustrated. This will tend, in addition to protecting the film, to frictionally maintain the containers in closed position.

It will be apparent that the construction described is effective for maintaining the containers in either extended position for exposing a length of film therebetween or in adjacent position for protecting the film from damage by light or otherwise during storage or handling.

When the holder is used with apparatus requiring the projection of light through or upon the film, the spaced plates 5 permit this operation. It will be apparent that the plates will ordinarily be spaced apart a distance which is slightly greater than the width of the film, whereby the necessary area of the film may be readily subjected to the desired light rays.

The construction illustrated in Figures 1 and 2 might obviously be modified by omitting one pair of the plates 5 and relying upon one hinge connection 6. It is, however, preferred to use the construction illustrated as it is of greater strength.

The rollers or spools 3 may each be provided with a suitable hub 12, which may extend outwardly through the flat side of the container for effecting a driving connection with either or both of the rollers when in position for use. The particular shape of the hubs 12 may be varied in accordance with the use to which the film holder is to be placed, whereby they will accurately engage with the cooperating driving mechanism, either hand or motor driven, in the particular instrument or apparatus with which the holder is used.

In the construction of the containers 2, they may first be made up with one side in place and having the other side constructed separately. After the rollers or spools have been inserted, the other side may be placed in position and either permanently, frictionally or otherwise secured in such position as will be apparent.

In order to provide for the location and accurate registration of the holder in the machine, e. g. projector or camera, wherein it is to be used, one or both of the flat sides of the two containers 2 may be formed with an annular recess 48 which is concentric with the container and with the spool within it. This recess may be of wedge-shaped or tapering section as illustrated in Figures 9 and 12, and it may be used in co-operation with a correspondingly shaped rib 45 formed on a part 46 of the machine (see Figure 9) whereon the holder is mounted. By pressing the holder against the part 46 for example by a spring or in any other convenient manner, the whole weight of the container may be supported by the member 46 whilst the spools within the holder are supported on the pins 47 which project through the said member 46 and engage the hubs 12 of the spools. The holes in the side walls of the two containers may thereby be made large enough to give a clearance between them and the hubs 12 aforesaid, so that in addition to accurate registration any friction which would arise from rubbing of the hubs 12 on the side walls of the holder is avoided. As shown in Figures 10 and 11 the recess may have the form of a dish 49 having an inwardly projecting and a vertical peripheral wall respectively. Further, instead of using a groove or recess on the holder and a rib on the frame member 46, these parts could be reversed. Figure 13 shows a holder provided with an annular rib 50. Also it will be appreciated that the rib need not be continuous, but it could alternatively be provided by arcuate sections or a series of projections spaced in a circle concentric with the spool. Also instead of being of wedge-shaped section it could be of curved or other appropriate section which will cooperate with correspondingly-shaped recesses to give a definite location for the holder in the machine.

In Figures 3 and 4 there is illustrated a modified embodiment of the invention in which the containers 14 are not hingedly connected but are provided with male and female dovetail slides 15 and 16, respectively, whereby they may be detachably interexchanged for storage purposes as desired. When so engaged, a cover plate 17 may be slipped in position, as shown in Figure 3, to provide a fire- or light-proof covering for the small length of film which remains exposed.

When this type of film holder is to be used, the dovetail connections 15 and 16 may be separated and an intermediate spacing member, not shown, having corresponding dovetail connections, may be slipped into position therebetween to insure the correct relative positioning of the containers. It will be obvious that the spacing member may either constitute a separate loose piece, or may constitute part of the particular instrument or apparatus with which the holder is being used.

Figures 5 and 6 of the drawings illustrate another modification of the present invention. In this construction the containers 18 are each provided with extension plates 19 having a hinged connection 20. The axis of this connection lies substantially in the plane of one of the sides of the container, whereby one of the containers can be swung over and superimposed upon the other as indicated in chain lines in Figure 6. The openings 21 by which the film enters the containers are so disposed that when the complete holder is folded, as described, the openings will lie side by side. This will result in imparting a twist to the film when bringing the two containers into adjacent position, and to obviate this one end or both ends of the film may be suitably constructed, as by providing a separate piece of fabric which will take up such twist.

It will be obvious to those skilled in the art that with any of the forms of holders which may be embraced within the scope of the present invention there may be provided either a leader, a trailer, or both, of suitable fabric, tape, fibre, or the like, whereby the body of the film itself may be conserved.

If it is desired, any convenient form of spring control may be provided on the hinged construction of the film holder in such manner as to tend to move the containers into adjacent relationship, or to retain them in either of the adjusted positions. This could be effected by providing a spring having its ends so connected that the body of the spring is adapted to lie on different sides of the hinged connection provided between the containers when the containers are in their different positions.

In Figures 7 and 8 there is illustrated a form of light-excluding device which may be used. This may combine a suitable housing 22 having slots or openings 23 therein adapted to receive the bearings formed on the roller 24. This construction permits the roller to move vertically as required by the film, thereby maintaining a light tight closure at all times. Other embodiments for this purpose will be obvious.

The present invention provides a film holder which is capable of being easily dimensioned to meet the requirements of the particular film to be held thereby, and which is light and inexpensive, thereby adapting it to individual and commercial use. It will be understood that if so desired, the holder may be enclosed in a separate casing when the two containers are in adjacent relationship to thereby give additional protection against injury to the film, if such additional protection is deemed desirable, or necessary. This separate casing, however, constitutes no part of the present invention.

The present application is a continuation in part of application Serial No. 494,772, filed August 24, 1921, which has matured as Patent No. 1,440,173, dated Dec. 26, 1922. Matter shown and described in this application is claimed in the above mentioned application.

The term "film" as used throughout the specification and claims is used in its generic sense as including within its definition material of any character adapted to receive thereon or carry images either positive or negative.

The advantages of the present invention arise from the provision of a film holder of such construction that the film-holding portions thereof may occupy a plurality of different positions, each different position being effective for exposing or protecting a length of the film as required.

We claim:

1. In a film holder, a plurality of film-receiving containers adapted to occupy a plurality of different relative positions, in at least one of which positions a length of film is exposed and in another of which the exposed length of film is materially lessened, and a spool in each container, one side of each container having positioning means for locating the containers in position on a support independently of the spools.

2. In a film holder, a plurality of film-receiving containers and means permitting the containers to be secured in either adjacent or in extended relationship, each container having an axial hole through the same, and one side of each container having circular positioning means concentric with the respective hole for locating the containers in position on a support.

3. In a film holder, two film-receiving containers adapted to occupy either of two predetermined positions, and means permitting said containers to occupy either of said positions, each container having an axial hole through the same, and one side of each container having a circular recess of tapering cross-section concentric with the respective hole for locating the containers in position on a support.

4. In a film holder, a plurality of film-receiving containers adapted to occupy a plurality of different relative positions, in at least one of which positions a length of film is exposed and in another of which the exposed length of film is materially lessened, and a spool in each container, each container having means for locating the same in position on a support independently of the spools.

5. As an article of manufacture, a film holder comprising a casing, a film spool in said casing, said casing and spool having aligning openings for the reception of a supporting means for the spool, and an irregular surface formation on said casing adapted to cooperate with said supporting means to position the casing independently of said spool.

6. As an article of manufacture, a film holder comprising a casing, a film spool in said casing, said casing and spool having aligning openings for the reception of a supporting means for the spool, and an irregular surface formation on said casing surrounding the opening therein and adapted to cooperate with said supporting means to position the casing independently of said spool.

7. As an article of manufacture, a film holder comprising a casing, a film spool in said casing, said casing and spool having aligning openings for the reception of a supporting means for the spool, and an irregular surface formation on said casing adjacent the opening therein and adapted to cooperate with said supporting means to position the casing independently of said spool.

8. In a photographic apparatus, a film holder comprising a casing, a film spool in said casing and movable relatively to said casing, said casing and spool having aligning openings for the reception of a supporting spindle, mechanism including said spindle, and a positioning means on said mechanism directly cooperating with a face of said casing for positioning said casing independently of said spool.

9. In a photographic apparatus, a film holder comprising a casing, a film spool in said casing and movable relatively to said casing, said casing and spool having aligning openings for the reception of a supporting spindle, mechanism including said spindle, and a positioning means on said mechanism cooperating with said casing for positioning said casing independently of said spool, said positioning means comprising a projection on said mechanism adapted to engage a wall of said casing.

10. In a photographic apparatus, a film holder comprising a casing, a film spool in said casing and movable relatively to said casing, said casing and spool having aligning openings for the reception of a supporting spindle, mechanism including said spindle, and a positioning means on said mechanism cooperating with said casing for positioning said casing independently of said spool, said positioning means comprising a projection on said mechanism adapted to cooperate with said casing, a wall of said casing having a depression adapted to interfit with said projection.

11. In a photographic apparatus, a film holder comprising a casing, a film spool in said casing and movable relatively to said casing, said casing and spool having aligning openings for the reception of a supporting spindle, mechanism including said spindle, and a positioning means on said mechanism cooperating with said casing for positioning said casing independently of said spool, a wall of said casing having a socket for cooperation with said positioning means.

12. In a photographic apparatus, a film holder comprising a casing, a film spool in said casing and movable relatively to said casing, said casing and spool having aligning openings for the reception of a supporting spindle, mechanism including said spindle, and a positioning means on said mechanism cooperating with said casing for positioning said casing independently of said spool, a wall of said casing having a socket for cooperation with said positioning means, said socket and said positioning means being concentric to said spindle when the parts are in assembled relationship.

13. In a photographic apparatus, a film holder comprising a casing, a film spool in said casing and movable relatively to said casing, said casing and spool having aligning openings for the reception of a supporting spindle, mechanism including said spindle, and a positioning means on said mechanism directly engaging a face of said casing for positioning said casing independently of said spool.

14. In a photographic apparatus, a film holder comprising a casing, a film spool in said casing and movable relatively to said casing, said casing and spool having aligning openings for the reception of a supporting spindle, mechanism including said spindle, and a positioning means on said mechanism directly cooperating with a face of said casing for positioning said casing independently of said spool, said positioning means being operative upon the placing of said film holder upon said mechanism.

15. In a photographic apparatus, a film holder comprising a casing having a non-adjustable surface formation thereon, a film spool in said casing and rotatable relatively to said casing, said casing and spool having aligning openings for the reception of a supporting spindle, mechanism including said spindle, and a positioning means on said mechanism cooperating with said non-adjustable surface formation of said casing for automatically positioning said casing independently of said spool, said positioning means comprising a projection on said mechanism adapted to engage said casing, said positioning means being operative upon the placing of said film holder upon said mechanism.

16. In a photographic apparatus, a film holder comprising a casing, a film spool in said casing and rotatable relatively to said casing, said casing and spool having aligning openings for the reception of a supporting spindle, mechanism including said spindle, and a positioning means on said mechanism cooperating with said casing for positioning said casing independently of said spool, said positioning means comprising a projection on said mechanism adapted to cooperate with said casing, said casing having a depression adapted to interfit frictionally with said projection, said positioning means being operative upon the placing of said film holder upon said mechanism.

17. In a photographic apparatus, a film holder comprising a casing, a film spool in said casing and movable relatively to said casing, said casing and spool having aligning openings for the reception of a supporting spindle, mechanism including said spindle, and a positioning means on said mechanism cooperating with said casing for positioning said casing independently of said spool, said casing having a socket for cooperation with said positioning means by peripheral engagement, said positioning means being operative upon the placing of said film holder upon said mechanism.

18. In a photographic apparatus, a film holder comprising a casing, a film spool in said casing and movable relatively to said casing, said casing and spool having aligning openings for the reception of a supporting spindle, mechanism including said spindle, and a positioning means on said mechanism cooperating with said casing for positioning said casing independently of said spool, said casing having a socket directly cooperating with said positioning means for preventing relative movement therebetween radially of said openings, said socket and said positioning means being concentric to said spindle when the parts are in assembled relationship, said positioning means being operative upon the placing of said film holder upon said mechanism.

19. In a photographic apparatus, a film holder comprising a casing, a film spool in said casing and movable relative to said casing, said casing and spool having aligned openings for the reception of a supporting spindle, a supporting mechanism comprising a spindle having provision for automatically engaging said spool, and means including said spindle, and a positioning means on said mechanism directly engaging a face of said casing for positioning said casing, whereby said casing and spool are both automatically and completely centered independently of each other upon the placing of said film holder upon said spindle.

In testimony whereof we have signed our names to this specification.

HERBERT GEORGE PONTING.
GEORGE WILLIAM FORD.